(12) United States Patent
Rabey

(10) Patent No.: US 8,723,670 B2
(45) Date of Patent: May 13, 2014

(54) AUDIO/VISUAL ANNUCIATOR FOR MARKING POINTS OF INTEREST

(76) Inventor: Roy Rabey, Carrollton, TX (US)

( * ) Notice: Subject to any disclaimer, the term of this patent is extended or adjusted under 35 U.S.C. 154(b) by 559 days.

(21) Appl. No.: 13/042,680

(22) Filed: Mar. 8, 2011

(65) Prior Publication Data

US 2012/0229274 A1 Sep. 13, 2012

(51) Int. Cl.
G08B 1/08 (2006.01)
G08B 23/00 (2006.01)

(52) U.S. Cl.
USPC .......... 340/539.13; 340/815.45; 340/332; 340/573.1; 340/636.2; 362/249.02

(58) Field of Classification Search
USPC ............ 340/815.45, 815.4, 815.66, 815.67, 340/815.65, 539.13, 332, 573.1, 691.6, 635, 340/636.2; 362/183, 272, 236, 240, 249.02, 362/227
See application file for complete search history.

(56) References Cited

U.S. PATENT DOCUMENTS

| 3,323,117 A | 5/1967 | Mason et al. | |
| 4,985,813 A | 1/1991 | Putman | |
| 7,093,962 B2 | 8/2006 | Mahoney | |
| 7,598,856 B1 * | 10/2009 | Nick et al. | 340/539.13 |
| 7,880,637 B2 * | 2/2011 | Weiss | 340/815.45 |
| 2008/0037257 A1 * | 2/2008 | Bolta | 362/294 |
| 2008/0174989 A1 * | 7/2008 | Robinett | 362/183 |

* cited by examiner

Primary Examiner — Anh V La
(74) Attorney, Agent, or Firm — Valenti, Hanley & Robinson, PLLC; Kevin T. Duncan

(57) ABSTRACT

The present invention provides a system and method for marking and/or tracking the location of victims and other items of interest, including marking points of danger, often associated with an emergency, a disaster, a mass casualty incident, or other catastrophe. In particular, the invention pertains to systems and methods for marking and tracking locations utilizing portable devices that are transportable in vehicles operated by emergency responder personnel and rapidly charged to an operational state for immediate use in emergency situations. The invention provides critical assistance to search and rescue personnel called upon to enter unfamiliar structures or areas under low light or poor visibility conditions. The invention may be used to mark unfamiliar territory to facilitate ingress and egress in times of emergency.

19 Claims, 5 Drawing Sheets

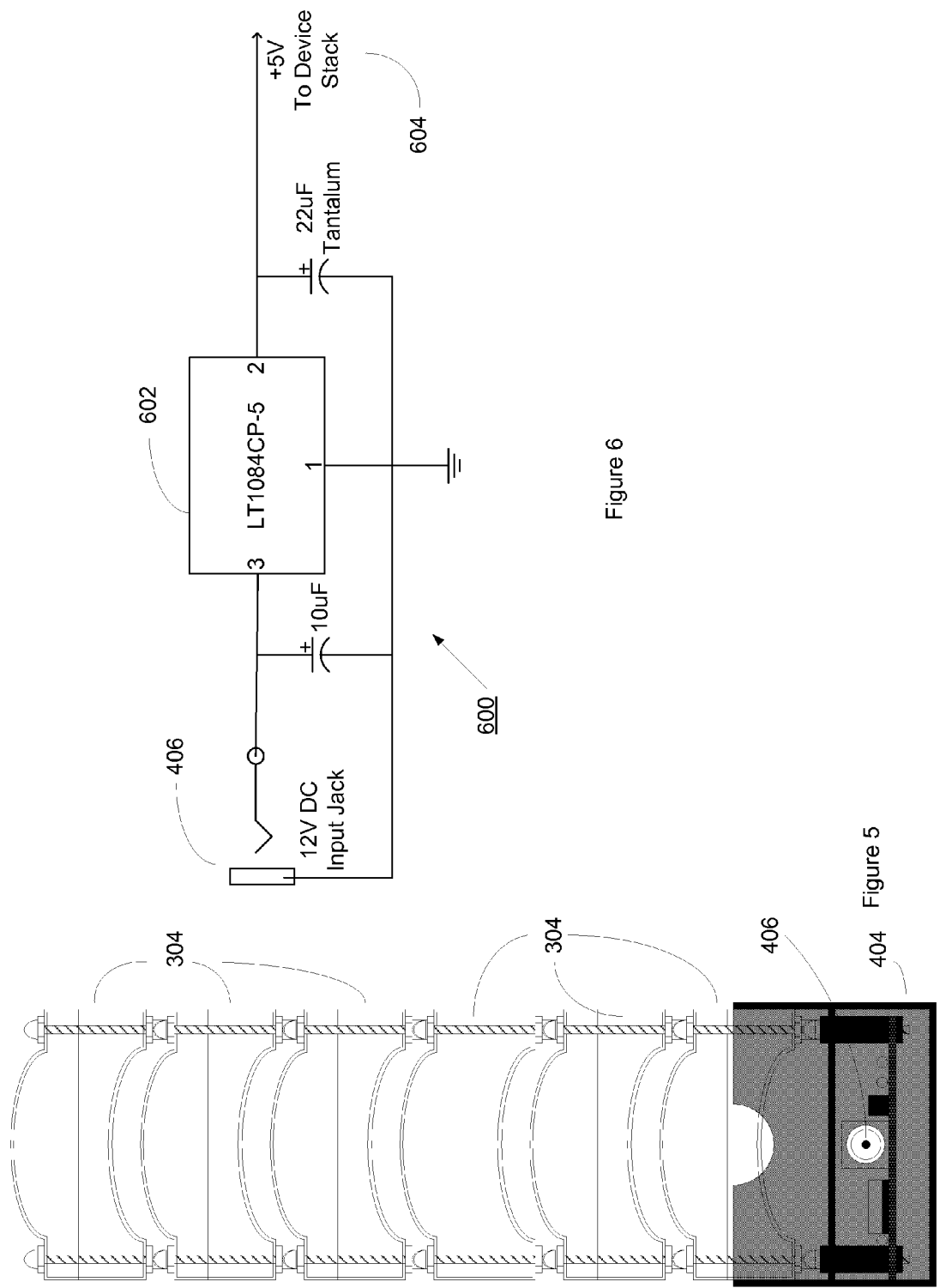

AUDIO/VISUAL ANNUCIATOR FOR MARKING POINTS OF INTEREST

FIELD OF THE INVENTION

The present invention relates generally to the field of rescue and recovery operations and in particular to the use of electronic light and/or sound emitting devices to mark points of interest. A combination of marking devices, e.g., visual, aural or a combination, may be used depending on known or anticipated conditions. The marking devices may include rechargeable or disposable electronic devices and may be used by emergency responder personnel to indicate points of interest in low visibility environments, e.g., smoke-filled spaces resulting from fires, or remote locations.

BACKGROUND OF THE INVENTION

Since man began building dwellings and other structures, fire, earthquakes, faulty building design and other incidents have been causes of damage and even collapse of such buildings. Many people have died or been injured as a result of such calamities. Property damage is another significant loss resulting from such events. Societies have long maintained fire departments, emergency medical units, and other groups to respond to such incidents in an effort to prevent or minimize human suffering as well as property loss. In addition to professional and/or dedicated emergency response organizations, e.g., fire department, other groups, such as CERT (Community Emergency Response Teams), comprised of volunteer, non-professional emergency responders, also respond to emergency situations. CERT and other like organizations also train volunteers to serve as responders. These "responders" often face very difficult and unknown conditions, e.g., fire, smoke, unstable structures, injured victims, unfamiliar building layouts, etc. For instance, entering or navigating through a burning building a fireman or other responder may face blinding, dense smoke.

Casualty incidents often arise from natural disasters and other emergency situations and present logistical challenges to emergency response personnel when time is of the essence in ascertaining the identification, status, and medical condition of victims. In certain situations, e.g., earthquakes, responders proceed with a phased approach to assessing and then mitigating injury and loss following catastrophic events. For instance, first responders to a collapsed building, including with the aid of devices or trained dogs, search for injured persons. Those that cannot be immediately extricated from wreckage are identified for later rescue and/or treatment. In addition to emergency situations, the invention may be used to help track location of individuals in remote areas or unfamiliar locations. For example, military or boy scouts or other individuals working on developing survival skills or just in participating in planned activities may use the marking devices. Also, rescuers searching for lost hikers or campers may use the invention to help mark search areas or locations of interest that may contribute to locating the lost individual. This may be particularly helpful in situations where there is a sudden and extreme environmental condition, e.g., sudden and intense snowfalls, rains/floods, fog, etc.

Search and rescue personnel often enter unfamiliar areas with low visibility, such as a dilapidated building at night. Emergency personnel can use light and/or sound emitting devices to indicate points of interest such as a pathway for ingress and egress, a hazard, or an injured person. One problem with existing visual annunciators is that the on-board power source is typically battery-based. Batteries require a pro-longed time to recharge and have relatively short lifespans, especially when compared to certain types of rapidly charging and slowly discharging capacitors. If a battery is not charged at the time of emergency then the delay in charging the device may render it useless and the rapid discharge may limit even a charged device's usefulness. For example, rescue personnel may have marked an injured person with an annunciator while they search for additional injured people. If the battery goes out, the injured person's location may be lost, thereby risking further injury to the person.

If batteries have to be replaced, valuable time may be lost. Additionally, replacing batteries in low visibility environments can be difficult, which could reduce efficiency. If there are no replacement batteries on hand, the operation may be stalled until the batteries can be replaced or charged. For example, military personnel may use an annunciator to mark a target of interest for a subsequent night operation. Should the annunciator battery go out, personnel must partake in a difficult low visibility replacement of the battery with failure leading to a lost opportunity to take out the target.

Devices using batteries also require a larger volume than devices using rapid-charging capacitors. Accordingly, the invention has the advantage of decreasing the product's size and weight. Decreased size and weight is a benefit to rescue/responder personnel, thereby increasing operational efficiency. Further, personnel that are forced to carry larger and heavier devices lose storage space for other necessary items. For example, campers often pack several pounds of gear in backpacks and have a limited amount of storage space. Assuming campers use emitters to mark a pathway, they need to carry multiple emitters, which may take up space that other useful survival tools would otherwise use. Thus, a smaller and lighter device provides an advantage over a larger and heavier device.

What is needed is a solution to address the various problems associated with light and/or sound emitting annunciators using batteries and other disadvantageous power sources.

SUMMARY OF THE INVENTION

The present invention provides a system and method for marking and/or tracking the location of victims and items of interest, including marking points of danger, often associated with an emergency, a disaster, a mass casualty incident, or other catastrophe. In particular, the invention pertains to systems and methods for marking and tracking locations utilizing portable devices that are transportable in vehicles operated by emergency responder personnel and rapidly charged to an operational state for immediate use in emergency situations. The need for the invention is rooted in the experience of trained search and rescue personnel. These personnel are called upon to enter unfamiliar structures or areas often under low light or other poor visibility conditions. As search personnel enter a structure or affected area and traverse unfamiliar territory a trail of these devices can be left along their ingress path. This trail of annunciators would facilitate efficient egress to the safe zone and allow new personnel to efficiently ingress to the location of the original search personnel or marked points of interest.

Mass casualty incidents may arise from emergency situations, including natural disasters (i.e., tornado, storms, hurricanes, earthquake, flood, etc.), fires, etc., and also from criminal actions, e.g., acts of terrorism. Such incidents present major logistical challenges for emergency response personnel, including locating victims, marking paths of egress and ingress, marking dangerous conditions, marking evidence, marking other items of interest or concern, and treating and transporting victims.

In addition to emergency situations, the invention may be used to help track location of individuals in remote areas or unfamiliar locations. For example, military or boy scouts or other individuals working on developing survival skills or just in participating in planned activities may use the marking devices. Also, rescuers searching for lost hikers or campers may use the invention to help mark search areas or locations of interest that may contribute to locating the lost individual. This may be particularly helpful in situations where there is a sudden and extreme environmental condition, e.g., sudden and intense snowfalls, rains/floods, fog, etc.

The present invention uses light/visual and/or sound-emitting devices or "annunciators" or markers to mark and/or track locations or objects of interest. Light, e.g., LEDs (light emitting diodes), and/or sound emitting devices are useful in low visibility environments. For example, search and rescue personnel often enter unfamiliar areas with low visibility, such as a dilapidated building at night. Emergency personnel can use light and/or sound emitting devices to indicate points of interest such as a pathway for ingress and egress, a hazard, or an injured person.

Annunciators may be used to mark paths of ingress and egress or paths to victim or other locations may be thought of as electronic breadcrumbs. Preferably, annunciators include a rechargeable power source, annunciator frequency control circuitry, annunciator intensity control circuitry, and annunciator components. Annunciators may be placed at locations to emit light or sound within low visibility environments or remote locations for uses such as: marking a pathway of ingress and egress, a target of interest, an injured person, an object for recovery, a hazard or an investigative, evidenciary or other point of interest. The invention may include a device for monitoring or detecting the location of the annunciators either within the structure or without the structure. Personnel working with the responder may track the progress of the response effort and may detect when a responder deploys an annunciator. The system may include a device that sends an alert of distress on the part of the responder or a call for assistance. The system may be used in combination with a radio or other communications system. In addition, some or all of the annunciators may include a GPS (Global Positioning System) component that is detectable by a supervisory station. The supervisory station may present a map or building layout and may detect or present the location of the annunciator and/or responder. A user of the station may provide feedback or directions to the responder based on position, such as via a radio transceiver.

Upon reaching an injured person, hazard, object for recovery, source of fire or other point of interest, a responder may place an annunciator to mark the point of interest. The annunciator system may include a set of annunciators comprised of specific types to mark or identify specific items. For instance, a blue flashing light type annunciator may be placed to identify an injured person. One or a series of green flashing lights may be used to mark a path found to be safe or to mark the path taken by the responder to assist in retracing her footsteps for exiting the structure. A red flashing light may be used to mark a dangerous condition and a yellow flashing light may be used to indicate caution. An audible annunciator may be used in lieu of or in combination with a visual annunciator.

The invention also may be used in military applications. For example, an infrared or other band annunciator may be used to mark locations without being visible without the aid of a device. Annunciators may also be RF or passive devices that do not "illuminate" or otherwise become detectable until being activated by an outside source. Also, a high frequency audible annunciator may be used above the human range of perception.

A common problem encountered by volunteer emergency responders is that the equipment they use experience long periods of non-use. The equipment used is primarily stored in vehicles, such as in trunks or other storage areas during periods of non-use. As a result, flashlights, radios, and other electrical equipment lose their charge and become inoperable or operable for diminished periods of time. To prevent or correct this, responders must maintain the equipment and/or store and maintain sources of power, e.g., store spare batteries or charging equipment. This takes up additional space and in the case of spare batteries, they too will lose charge over time and require maintenance. It is inconvenient to have emergency equipment continuously plugged into low voltage sources, e.g., cigarette lighter. Typical batteries take too long to charge in the context of emergency response.

Instead of traditional batteries, the present invention preferably employs annunciators with high-speed charging capacitors as the integrated power source. These relatively recently available devices are known as "super capacitors" and include nano-porous capacitors and have shelf life, for example, that is 10-20 times greater than that of batteries. See http://en.wikipedia.org/wiki/Super_capacitor, the content of which is hereby incorporated by reference, for a more detailed discussion of super capacitors. Typically, batteries have the further limitation that they are only capable of significantly fewer charges when compared with capacitors. While capacity to store charge is greater in batteries, this is not a key concern for the emergency devices of the present invention. The annunciators preferably use super capacitors that may be recharged in a fraction of the time that it takes standard batteries to charge. Preferably the annunciators can be plugged into any 12 volt power source, such as a car cigarette lighter, for rapid charge. In this manner, the responder may use the time it takes to drive to the site of an emergency to plug in and completely charge the annunciator system. Additionally, battery at same voltage as a capacitor has a greater capacity to deliver current than the capacitor can charge/discharge instantly. A key is to reduce the draw of current on charge of capacitor—control how rapidly charge is drawn from capacitor. Battery may be better for high power needs. For example, the annunciator capacitors can be charged in 10 seconds and can operate for 24 hours depending on the configuration of the on-board power source, efficiency, duty cycle of the annunciator, and supporting circuitry. Flashing annunciators last longer or have a longer operational period between charges.

More recently, so-called "super-capacitors" or "ultra-capacitors" are a new technology that provides small, compact devices that are capable of holding longer charge relative to size. For example, such capacitors are used as flashes in cameras to give off charge quickly. A battery charges the capacitor, which then provides rapid discharge for flash. More rapid than possible with the battery. The technology is starting to approach the capacity of battery charge. For example Black and Decker has introduced an electric-powered screw-driver having a super capacitor in lieu of batteries to provide rapid discharge. Even more recently is the use of so-called "nano-capacitor" technology in which nano-porous properties are used to increase capacity and are used to increase capacity by making changes at the molecular level.

The annunciators use circuitry and components that are scalable. Due to the scalability of the invention's circuits and components, device packaging can range from very small "electronic breadcrumbs" that could be used in multiples to indicate a path of ingress or egress to larger illuminated signage such as arrows, caution signs, and other meaningful icons. Additionally, lighter and smaller markers may be more useful to users who need storage space for other items. For example, military personnel who carry all of their gear on their backs need a lightweight and small annunciator.

Visual annunciators are available in a wide range of light frequencies and can be used to support various standard operating procedures. For example, a search and rescue team could use the color "red" to indicate an injured person and the color "green" to indicate a safe pathway. The light frequency and intensity may be adjusted by the control circuitry on the annunciator.

Visual annunciators are capable of emitting infrared light where markers can only be seen with visual aids capable of viewing the specific light spectrum. For example, military personnel could attach visual annunciators to personnel that can only be seen through night-vision goggles in order to prevent friendly fire or to mark targets of interest for a subsequent attack.

The annunciator and system may be used for training volunteer or professional emergency responders in simulated emergencies.

In one embodiment, the present invention provides a method of marking locations of interest in emergency situations, the method comprising: providing a base charging station for receiving and charging a plurality of annunciators; providing a plurality of annunciators for deployment in emergency or training situations at one or more remote sites; rapidly charging the plurality of annunciators, each annunciator having at least one non-battery, high density (super/ultra) capacitor adapted to store and deliver power to the annunciator components; selectively activating one or more of the plurality of annunciators including activating an annunciator control section comprising a comparator; and placing the one or more of the plurality of annunciators at one or more locations of interest at the remote site. The method may further include the steps of placing a first one of the set of annunciators at a first location at the site of the emergency; and placing a second one of the set of annunciators at a second location of the site of the emergency; wherein the first one and the second one of the set of annunciators are distinguishable so as to represent different items of interest. In addition, the method may further comprise: selectively activating the one or more of the plurality of annunciators to operate based on a plurality of indicator settings.

In a second embodiment, the invention provides a method for locating by a responder items of interest within an emergency area using a responder system comprising a set of portable electronic marking devices comprised of at least two types of marking modes for use in distinguishing items of interest. The method comprises: providing a responder with a plurality of electronic marking devices capable of a plurality of types of indication; a responder entering an emergency site and locating items of interest; selectively activating and placing by the responder a first-type marking device at a first-type item of interest; and selectively activating and placing by the responder a second-type marking device at a second-type item of interest. The method may be used wherein the set of portable marking devices includes marking device types representing at least two of the following types of items of interest: casualties; dangerous conditions; ingress/egress path; evidence; source of emergency; location of responder; location of target for responsive action; and location of perpetrator; and wherein the set of portable marking devices includes at least two of the following types of marking modes:

LED; sound emitting; light emitting; signal emitting; magnetic field emitting; and thermal signature. The set of portable marking devices may include RFID components, which may comprise RF transmitter/receiver transported by the responder within the structure, and may further comprise a base component outside of the structure for presenting locations of at least one of the set of portable marking devices, e.g., GPS-enabled marking device.

In a third embodiment, the invention provides a transportable emergency response annunciator system comprising: a base charging station for receiving and charging a plurality of annunciators; a plurality of annunciators for deployment in emergency situations at one or more emergency sites, each annunciator comprising: at least one non-battery, high density (super/ultra) capacitor adapted to store and deliver power to the annunciator components; an annunciation device; and an annunciator control section comprising a comparator. The charging base station may include charging terminals and the annunciator device may include charging terminals configured to correspond to the charging base station charging terminals so as to provide a stacked charging configuration of a plurality of annunciator devices. A means for securing the plurality of annunciators with the charging base station in a stacked configuration to facilitate storage and transport of the system may be used. The annunciator control section may include a high current capacity voltage regulator adapted to deliver a desired charge to the plurality of annunciators in electrical connection with the charging base station.

In a fourth embodiment, the invention provides a method of marking and tracking locations of interest in emergency situations. The method comprises: notifying emergency responders to appear at a site of an emergency; rapidly charging a set of annunciators, each annunciator having at least one non-battery, high density (super/ultra) capacitor adapted to store and deliver power to annunciator components; providing emergency responders with a set of annunciators for use at the site of the emergency for use in marking and locating items of interest; and tracking locations of annunciators deployed at the site of the emergency.

BRIEF DESCRIPTION OF DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 5 is a side-view of an exemplary stackable configuration associated with the charging base and annunciator devices for field deployment in accordance with the present invention.

FIG. 6 is a circuit diagram showing an exemplary embodiment of the charging base with voltage regulator in accordance with the present invention.

DETAILED DESCRIPTION OF PREFERRED EMBODIMENT

Figure 1:
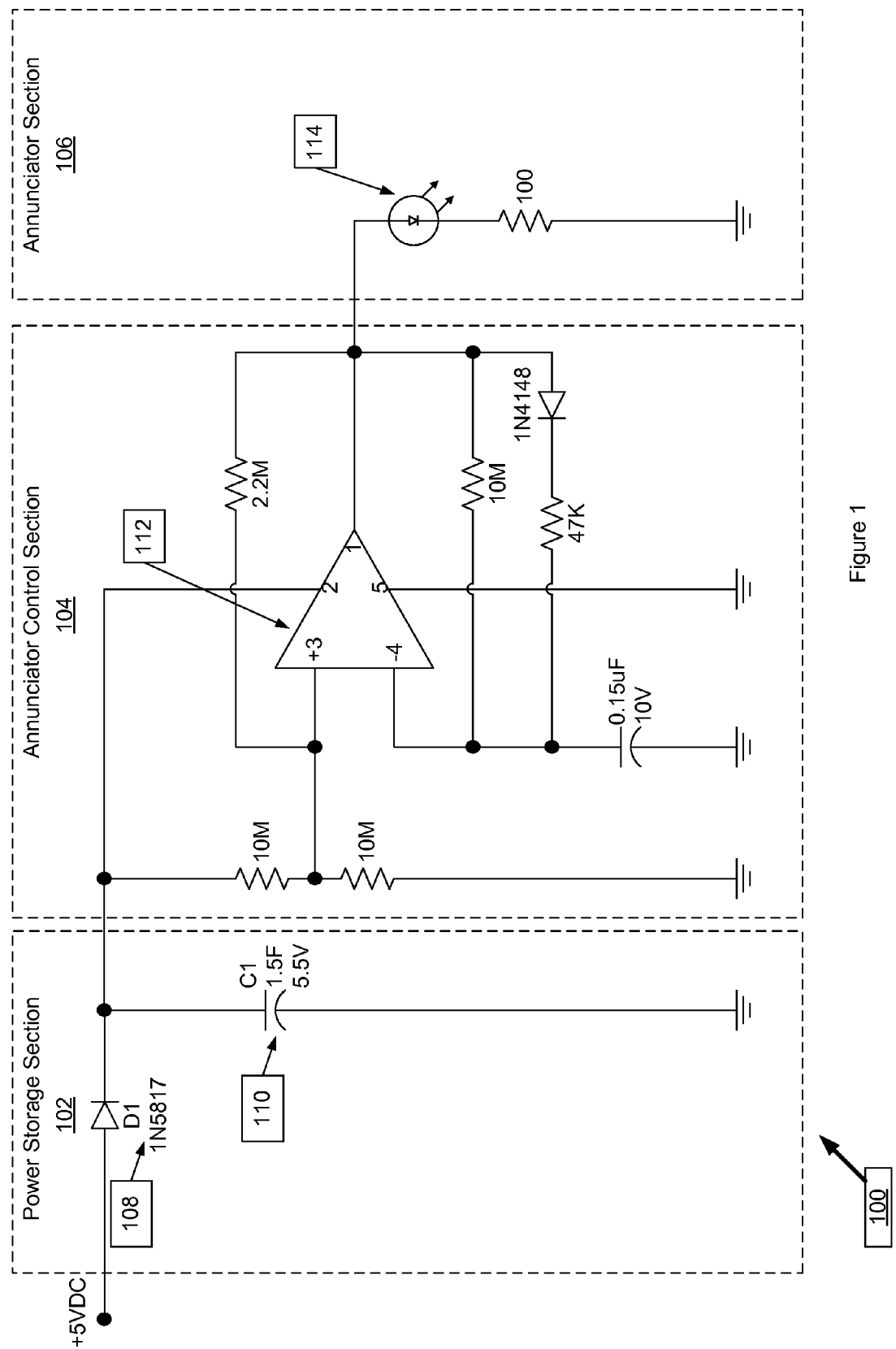
FIG. 1 represents a schematic diagram of a first embodiment of the emergency annunciator of the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The present invention provides a system of light/visual and/or sound-emitting devices or "annunciators" or markers to mark and/or track locations or objects of interest. Annunciators used to mark paths of ingress and egress or paths to victim or other locations may be thought of as electronic breadcrumbs. Preferably, annunciators include a rechargeable power source, annunciator frequency control circuitry, annunciator intensity control circuitry, and annunciator components. Annunciators may be placed at locations to emit light or sound within low visibility environments or remote locations for uses such as: marking a pathway of ingress and egress, a target of interest, an injured person, an object for recovery, a hazard or an investigative, evidenciary or other point of interest. The invention may include a device for monitoring or detecting the location of the annunciators either within the structure or without the structure. Personnel working with the responder may track the progress of the response effort and may detect when a responder deploys an annunciator. The system may include a device that sends an alert of distress on the part of the responder or a call for assistance. The system may be used in combination with a radio or other communications system. In addition, some or all of the annunciators may include a GPS (Global Positioning System) component that is detectable by a supervisory station. The supervisory station may present a map or building layout and may detect or present the location of the annunciator and/or responder. A user of the station may provide feedback or directions to the responder based on position, such as via a radio transceiver.

Upon reaching an injured person, hazard, object for recovery, source of fire or other point of interest, a responder may place an annunciator to mark the point of interest. The annunciator system may include a set of annunciators comprised of specific types to mark or identify specific items. Visual annunciators are available in a wide range of light frequencies and thus can be used to support various standard operating procedures as in green for "Team A", yellow for "Team B", red to mark hazards, blue to mark victim location, etc. Annunciators that emit invisible light, as in infrared, lend themselves to military operations where markers can only be seen with visual aids capable of viewing the specific light spectrum as in night-vision goggles, FLIR, etc. In another example, a blue flashing light type annunciator may be placed to identify an injured person. One or a series of green flashing lights may be used to mark a path found to be safe or to mark the path taken by the responder to assist in retracing her footsteps for exiting the structure. A red flashing light may be used to mark a dangerous condition and a yellow flashing light may be used to indicate caution. An audible annunciator may be used in lieu of or in combination with a visual annunciator. In addition, the annunciator may include particular and distinguishable shapes or illuminated images to further identify the item of interest or other point of information. The term "item of interest" as used herein is not necessarily a thing, such as a victim or a dangerous hazard, but may refer to a location or a point of reference, such as indicating a path taken or identified as safe or unsafe.

The invention also may be used in military applications. For example, an infrared or other band annunciator may be used to mark locations without being visible without the aid of a device. Annunciators may also be RF, RFID or passive devices that do not "illuminate" or otherwise become detectable until being activated by an outside source. Also, a high frequency audible annunciator may be used above the human range of perception.

A common problem encountered by volunteer emergency responders is that the equipment they use experience long periods of non-use. The equipment used is primarily stored in vehicles, such as in trunks or other storage areas during periods of non-use. As a result, flashlights, radios, and other electrical equipment lose their charge and become inoperable or operable for diminished periods of time. To prevent or correct this, responders must maintain the equipment and/or store and maintain sources of power, e.g., store spare batteries or charging equipment. This takes up additional space and in the case of spare batteries, they too will lose charge over time and require maintenance. It is inconvenient to have emergency equipment continuously plugged into low voltage sources, e.g., cigarette lighter. Typical batteries take too long to charge in the context of emergency response.

Instead of traditional batteries, the present invention preferably employs annunciators with high-speed charging capacitors as the integrated power source. The annunciators preferably use capacitors that may be recharged in a fraction of the time that it takes standard batteries to charge. Preferably the annunciators can be plugged into any 12 volt power source, such as a car cigarette lighter, for rapid charge. In this manner, the responder may use the time it takes to drive to the site of an emergency to plug in and completely charge the annunciator system. Additionally, capacitors have a longer charge period so that the annunciator may be left on for a longer period of time. For example, the annunciator capacitors can be charged in 10 seconds and can operate for 24 hours depending on the configuration of the on-board power source, efficiency, duty cycle of the annunciator, and supporting circuitry. Another advantage of specialized capacitor-based devices is that they can be stored for much longer periods than batteries and will fit in smaller and lighter packages.

Now with reference to FIG. 1, a super capacitor based high efficiency, low power consumption visual annunciator circuit 100 is shown. As shown in FIG. 1, the system of the present invention includes three primary sections: power storage section 102; annunciator control section 104 and annunciator section 106. Examples of available capacitors/annunciators and related components for use in the present invention includes: low power consumption Kingbright SMD chip LED light Part No. APD3224ZGC-F01, available from Kingbright (Annunciator section); Micro-power Op-Amp/Voltage Comparator (as in National Semiconductor LMC7215) (Annunciator control section); and Panasonic SG Series Double Layer Capacitor part no. EECS5R5H155 (annunciator power section).

The power storage section 102 includes a voltage polarity protection diode 108 and at least one high density (super/ultra) capacitor 110. One example of capacitor 110 is Panasonic SG Series Double Layer Capacitor (e.g., part no. EECS5R5H155). When the appropriate voltage is applied the capacitor(s) rapidly charge to near maximum energy storage capacity in a matter of seconds. To increase available energy storage the Farad rating of the capacitor(s) can be increased and/or the number of capacitors can be increased. There are numerous capacitor brands and configurations that can be used to provide this functionality.

The annunciator control section 104 is the main source of power drain for the device so a very low power consumption configuration is key to acceptable device operation. This implementation utilizes a micro-power voltage comparator 112 configured to operate as a multivibrator with feedback designed so that a pulse of about 15 milliamps is delivered about every 2 seconds to the annunciator section 106. One example of comparator 112 is Micro-power Op-Amp/Voltage Comparator (as in National Semiconductor LMC7215). This configuration results in an average power consumption of the device to be in the micro-amperes range which provides good overall operational performance. There are a number of semiconductor devices that are designed to operate with very low power consumption which include but are not limited to CMOS timers and MOSFETs that can be used to provide this functionality.

The annunciator section 106 provides the audio/visual indication profile of the device. There are a number of high-efficiency/low power consumption annunciator devices available. This implementation uses a common surface mount technology LED 114 which will allow for very lightweight, compact packaging. One example is a low power consumption Kingbright SMD chip LED light Part No. APD3224ZGC-F01, available from Kingbright. To increase visibility additional LEDs (not shown) can be added. Also, different color LEDs may be used to represent different conditions, e.g., degree of injury or death or priority, or items of interest, e.g., points of hazard or direction. Also, the annunciator may include a switch or other means to selectively activate the annunciation device to a desired mode of operation selected from a plurality of optional methods of operation. For example, the annunciator may have both a red and a green LED and may include a switch or the like to allow the responder to select which of the LEDs is to annunciate, illuminate or flash. For example, the red LED may be associated with a hazardous condition and the green LED may be associated with an injured person. In this manner the device may also be indexed between audio and visual types of annunciation. Also, the device may be selected to illuminate constantly or intermittent flashing.

Figure 2:
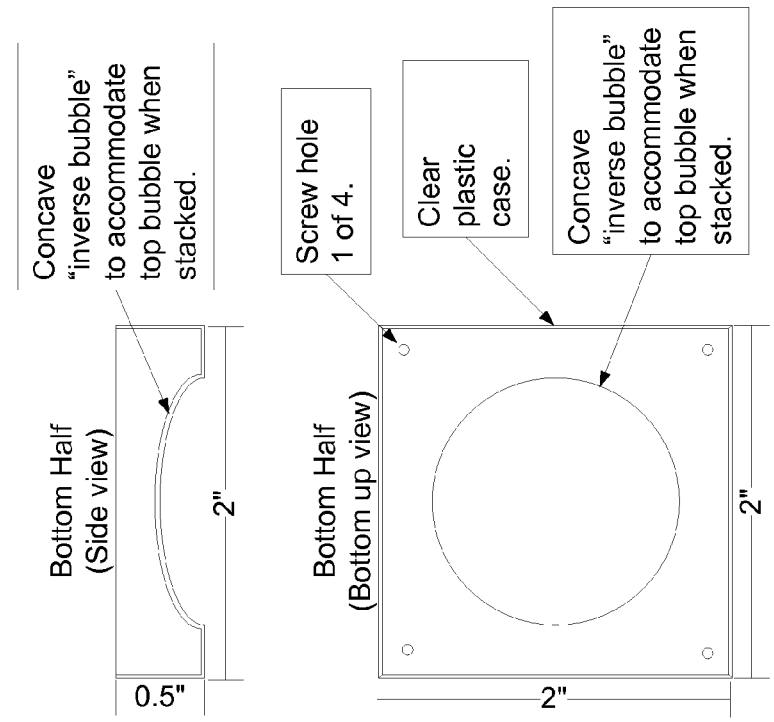
FIG. 2 represents an exemplary annunciator configuration and construct for field deployment in accordance with the invention.
Figure 2:
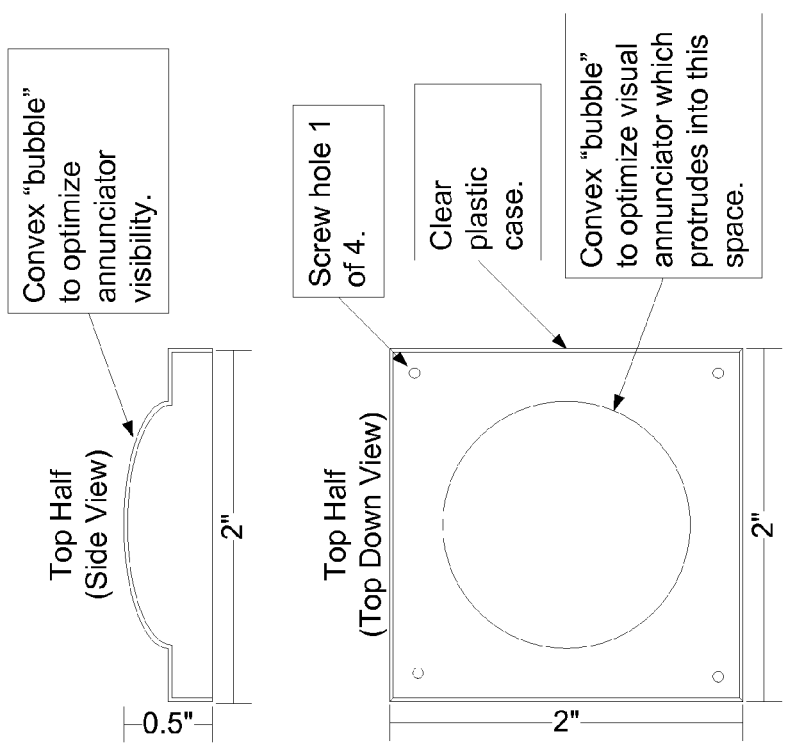
Figure 3:
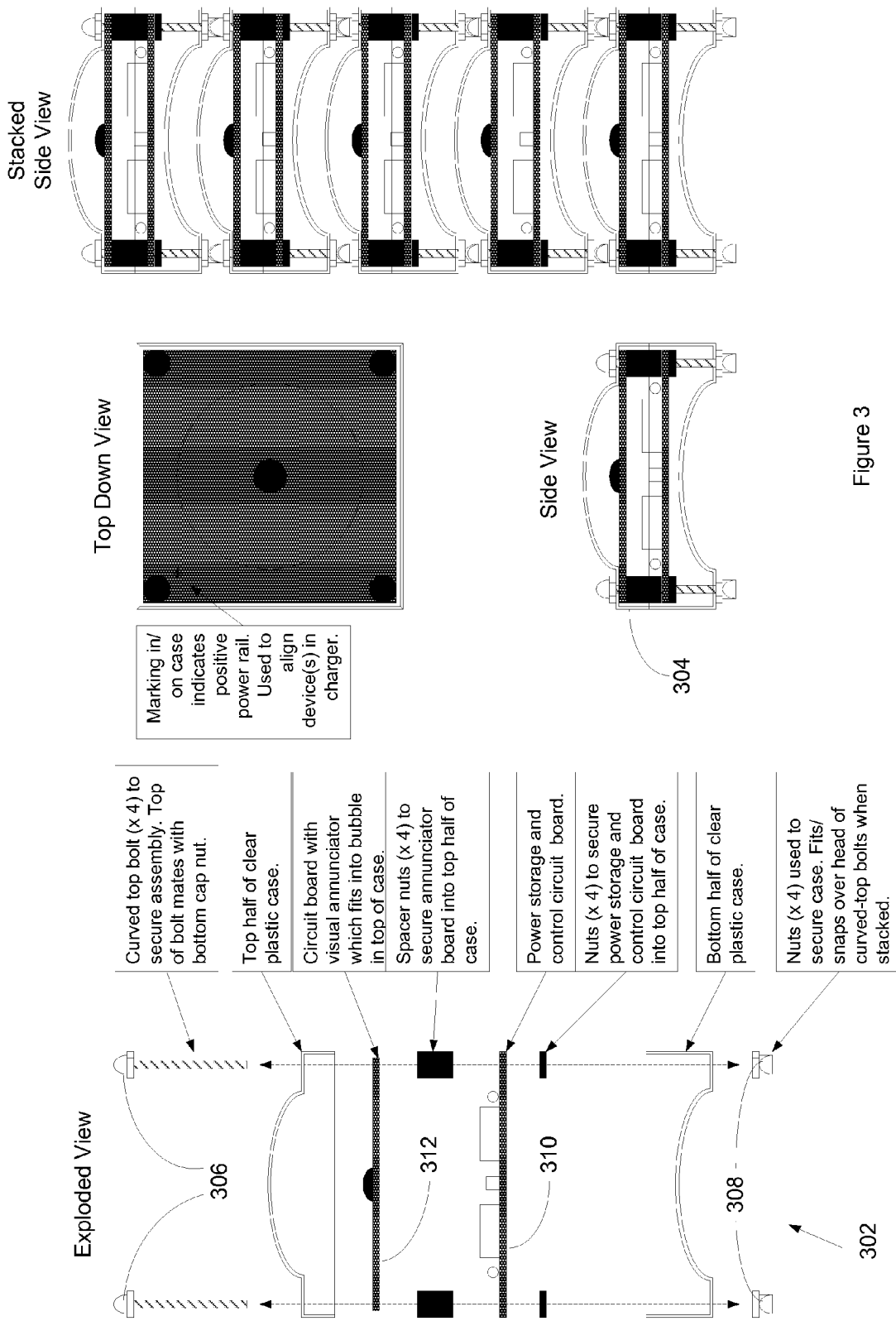
FIG. 3 represents a more detailed illustration of the annunciator configuration and construct for field deployment in accordance with the invention.

FIGS. 2 and 3 show exemplary ways to assemble the form of the inventive annunciator circuit product for deployment. As shown, it is preferable to have a convex, outwardly protruding light source, e.g., LED, to maximize light emitting surface area and visual perception when placed at an item of interest in an emergency situation. FIG. 3 provides an exploded view 302 and a side stacked view illustrating an exemplary configuration of the annunciator 304 of the present invention. In this configuration, the annunciators 304 are stackable to facilitate packaging, storing and transporting of the emergency responder annunciator system. As shown in FIG. 3, the annunciator 304 is configured so that the charge terminals, i.e., positive and negative terminals each comprising a bolt 306 and a nut 308, for each of the plurality of annunciators is serially aligned for group charging when placed on a base charging station. The configuration of charge terminals 306/308 are preferably designed to provide efficient and effective group charging and stacking. The annunciator includes indication means to insure proper alignment of positive and negative terminals 306/308. Circuit board 310 includes the power storage and annunciator control components and circuit board 312 includes the annunciator, in this case a visual annunciator. In an exemplary alternative, an audio annunciator may be used with or without a visual annunciator. A combination of annunciators may be used.

Figure 4:
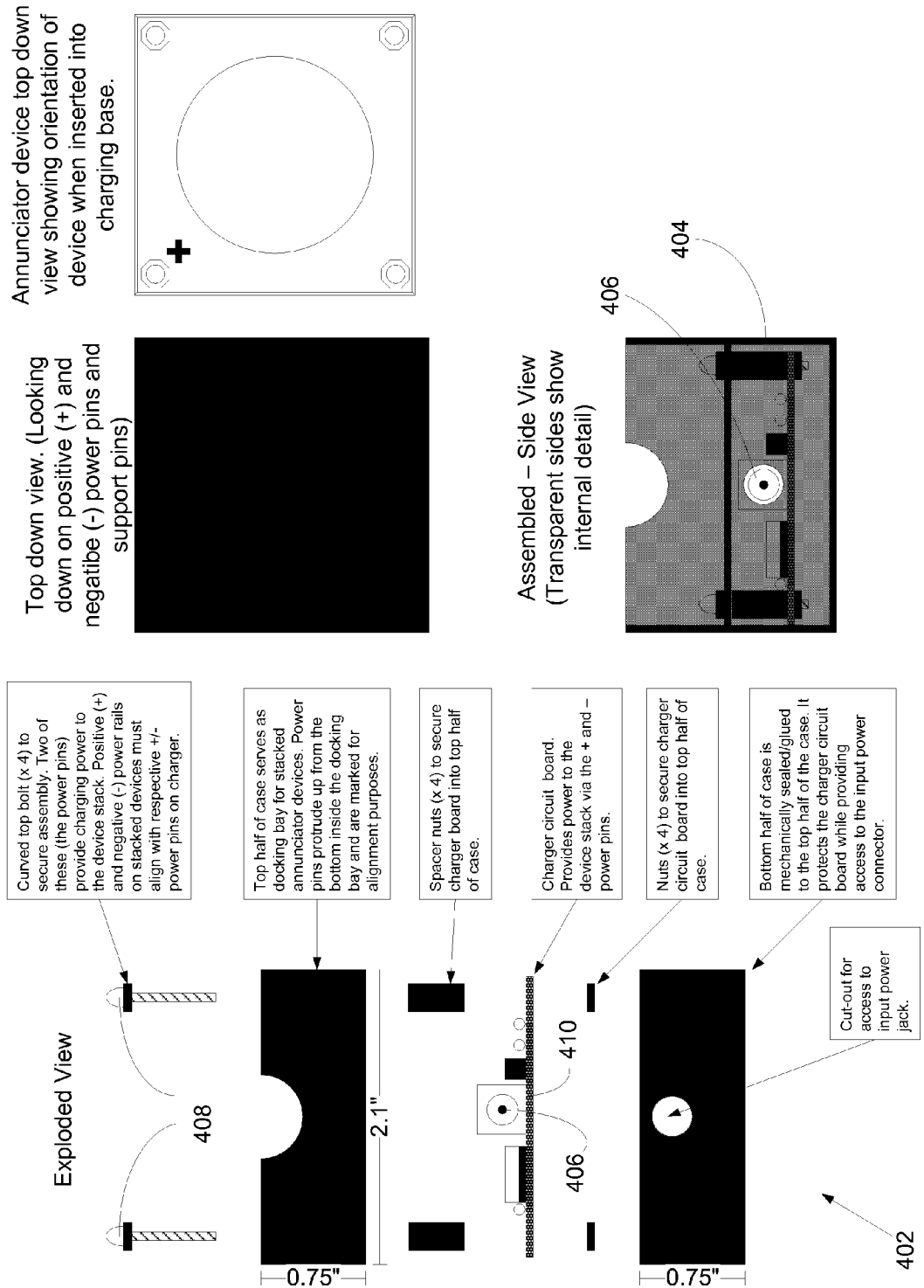
FIG. 4 represents an exemplary annunciator charging base configuration and construct for field deployment in accordance with the invention.

FIG. 4 shows an exploded view 402 and an assembled view of an exemplary charging base station 404 for receiving and charging one or more annunciators of FIG. 3. The charge base station includes a terminal or jack 406 for connecting the base station to a power source, e.g., a 12 volt or 120 VAC power source. The The terminals 306/308 of the annunciators 304 are polarity matched with the charging terminals, i.e., positive and negative terminals comprised of bolts 408, of the base station 404. The terminals are electrically connected to the charger circuit board 410, which provides power to the terminals 408 to thereby charge electrically connected annunciators 304. The terminals 408 are preferably configured to promote efficient electrical connectivity and effective stacking of annunciators 304. The circuit board 410 may include any necessary step down transformer components to provide the preferred charging voltage to the annunciators 304. The base of the charge base station provides a housing for the station as well as support for stacked annunciators. A locking strap, outer housing, enclosure or other suitable means may be used to hold the annunciators in stacked position with the charge base station during storage and transport.

FIG. 5 illustrates a stacking of a plurality of annunciators 304 in combination with charge base station 404 in the exemplary deployment. FIG. 6 illustrates an exemplary charge circuit 600 for use in the charger circuit board 410. As shown, the super capacitor charging circuit 600 includes high-current capacity voltage regulator(s) 602 that can handle the rush in current when a stack of annunciator devices 304 first start charging. In this example a low dropout positive fixed regulator 602, having 5 volt, 7.5 amp, part number LT1083 available from Linear Technology Corporation, receives an input of 12 VDC via input jack 406, or in the alternative stepped down from another power source, and delivers +5V output 604 to charge the stacked annunciators 304.

The annunciators 304 preferably use circuitry and components that are scalable. Due to the scalability of the invention's circuits and components, device packaging can range from very small "electronic breadcrumbs" that could be used in multiples to indicate a path of ingress or egress to larger illuminated signage such as arrows, caution signs, and other meaningful icons. Annunciators may be included on all "sides" or facings of the annunciator devices 304 so that illumination or annunciation is provided irrespective of the placement of the annunciator device. Additionally, lighter and smaller markers may be more useful to users who need storage space for other items. For example, military personnel who carry all of their gear on their backs need a lightweight and small annunciator.

Visual annunciators are available in a wide range of light frequencies and can be used to support various standard operating procedures. For example, a search and rescue team could use the color "red" to indicate an injured person and the color "green" to indicate a safe pathway. The light frequency and intensity may be adjusted by the control circuitry on the annunciator. Visual annunciators are capable of emitting infrared light where markers can only be seen with visual aids capable of viewing the specific light spectrum. For example, military personnel could attach visual annunciators to personnel that can only be seen through night-vision goggles in order to prevent friendly fire or to mark targets of interest for a subsequent attack. The annunciator and system may be used for training volunteer or professional emergency responders in simulated emergencies.

In one embodiment the invention provides a method of marking locations of interest in emergency situations. In operation, a responder receives a notification of an emergency and is called as an emergency responder to appear at a site of an emergency. The responder must travel to the site of the emergency. Often, volunteer responders do not have the use of special vehicles and instead use personal vehicles not specially equipped with emergency equipment. Instead, these volunteers may carry with them critical responder equipment that is stored in an inactive state for long periods of time. In keeping with the present invention the emergency equipment includes a set of annunciators for use in marking and locating items of interest at the scene of emergencies. Accordingly, it may be necessary for the responder to activate the equipment, including charging electronic devices. The invention is designed to facilitate rapid charging of emergency electronic equipment, such as the set of annunciators for use in marking items of interest in structures the subject of emergency being responded to. The responder relocates to the site of the emergency and in transit rapidly charges the set of annunciators to prepare them for use in marking and locating items of interest. In the alternative, the base charging station may be located at the site of the emergency and may be provided by someone other than the responder, e.g., a supervisory responder. The annunciators may be rapidly charged at site and may also be provided by someone other than the responder. Upon arriving at the site of the emergency and entering the structure, the responder locates items of interest at the emergency. Upon locating and identifying items of interest, the responder marks each item of interest with at least one of the set of annunciators.

More particularly, the responder places a first one of the set of annunciators at a first location at the site of the emergency and places a second one of the set of annunciators at a second location of the site of the emergency. The first one and the second one of the set of annunciators are distinguishable so as to represent different items of interest. In one manner of deployment, a CERT trailer or response vehicle may store and transport multiple sets or various components of the annunciator systems. Each responder may select from the set of annunciator system components a set of components deemed most appropriate for use given the particular nature of the emergency presented. In this way the invention provides a highly versatile configurable system. Also, many emergencies present a two-phase approach. The first phase involves assessing a victim situation and involves a search team of responders. The search team responders may have a particular set of annunciators for their use. Keys to the search phase is quick assessment, mark locations, stabilize each victim and quickly move on to the next. The second phase may be a rescue task and may involve a rescue team that may include or may not include members of the search team. The annunciators deployed by the search team help the rescue team locate victims for treatment and extrication. The annunciators may be graduated so that the search team may deploy annunciators that differentiate (e.g., variable flashing rates, different colors, sound, etc.) between critically wounded persons and those less seriously wounded. The rescue team may then attend to the most seriously wounded persons first and then move on to the less seriously wounded persons in a more effective manner.

The set of portable marking devices comprises at least two types of marking devices for use in distinguishing items of interest. The responder, upon entering a structure and locating items of interest, places a first-type marking device at a first-type item of interest and places a second-type marking device at a second-type item of interest. The first-type item of interest may be, for example, a casualty (e.g., a victim, injured person, etc.) and the second-type item of interest may be a non-casualty. The set of portable marking devices may include marking device types representing at least two of the following types of items of interest: casualties; dangerous conditions; ingress/egress path; evidence; source of emergency; location of responder; location of target for responsive action; location of perpetrator. The set of portable marking devices may include the following types of marking devices: sound emitting; light emitting; signal emitting; magnetic field emitting; and thermal signature. In the case of RFID components as marking devices, they may have an RF transmitter/receiver. Outside of the structure may be a base component for use by emergency personnel in tracking the response and response team. The base unit may include display for presenting locations of portable marking devices as well as the location of responders. Other responders may view the base unit before entering the structure. The set of portable marking devices may also include GPS-enabled marking devices. The base component may be used to present locations of the GPS-enabled marking devices. Alternatively, the invention may provide a system for annunciating location information that includes a plurality of transmitters for generating short range, highly directional beam signals to a plurality of mobile receivers.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A method of marking locations of interest in emergency situations, the method comprising:
   providing a base charging station for receiving and charging a plurality of annunciators;
   providing the plurality of annunciators for deployment in emergency or training situations at one or more remote sites;
   rapidly charging the plurality of annunciators, each annunciator having at least one non-battery, high density (super/ultra) capacitor adapted to store and deliver power to the annunciator components;
   selectively activating one or more of the plurality of annunciators including activating an annunciator control section comprising a comparator; and
   placing the one or more of the plurality of annunciators at one or more locations of interest at the remote site.

2. The method of claim 1 further comprising:
   placing a first one of the set of annunciators at a first location at the site of the emergency; and
   placing a second one of the set of annunciators at a second location of the site of the emergency;
   wherein the first one and the second one of the set of annunciators are distinguishable so as to represent different items of interest.

3. The method of claim 1 further comprising selectively activating the one or more of the plurality of annunciators to operate based on a plurality of indicator settings.

4. The method of claim 1, wherein each of the indicator settings represents a different type of subject to be marked.

5. A transportable emergency response annunciator system comprising:
- a base charging station for receiving and charging a plurality of annunciators;
- the plurality of annunciators for deployment in emergency situations at one or more emergency sites, each annunciator comprising:
- at least one non-battery, high density (super/ultra) capacitor adapted to store and deliver power to the annunciator components;
- an annunciation device; and
- an annunciator control section comprising a comparator.

6. The annunciator system of claim 5, wherein the annunciator device includes one or more of an LED, a light emitting device, a sound emitting device.

7. The annunciator system of claim 5, wherein the annunciator device includes two or more of an LED, a light emitting device, a sound emitting device.

8. The annunciator system of claim 5, comprising a plurality of annunciator devices.

9. The annunciator system of claim 5, wherein the plurality of annunciator devices are stackable to facilitate storage and transport of the system.

10. The annunciator system of claim 5, wherein the charging base station includes charging terminals and the annunciator device includes charging terminals configured to correspond to the charging base station charging terminals so as to provide a stacked charging configuration of a plurality of annunciator devices.

11. The annunciator system of claim 5, further comprising a means for securing the plurality of annunciators with the charging base station in a stacked configuration to facilitate storage and transport of the system.

12. The annunciator system of claim 5, wherein the annunciator control section includes a high current capacity voltage regulator adapted to deliver a desired charge to the plurality of annunciators in electrical connection with the charging base station.

13. The annunciator system of claim 5, further comprising a GPS enabled tracking device adapted to provide a location signal when the annunciator is deployed in an emergency or training situation.

14. The annunciator system of claim 5, further comprising a means for tracking the location of a deployed annunciator.

15. The annunciator system of claim 14, wherein the means for tracking is a hand-held device for use in an emergency or training situation.

16. The annunciator system of claim 5, further comprising a means for carrying a set of annunciators for deployment in an emergency or training situation.

17. The annunciator system of claim 5, wherein the annunciators are distinguishable so as to represent different items of interest.

18. The annunciator system of claim 5, wherein one or more of the plurality of annunciators comprise means for selectively activating the one or more of the plurality of annunciators to operate based on a plurality of indicator settings.

19. The annunciator system of claim 5, wherein each of the indicator settings represents a different type of subject to be marked.

* * * * *